United States Patent [19]
Arimilli et al.

[11] Patent Number: 6,049,849
[45] Date of Patent: Apr. 11, 2000

[54] IMPRECISE METHOD AND SYSTEM FOR SELECTING AN ALTERNATIVE CACHE ENTRY FOR REPLACEMENT IN RESPONSE TO A CONFLICT BETWEEN CACHE OPERATION REQUESTS

[75] Inventors: Ravi Kumar Arimilli, Austin; John Steven Dodson, Pflugerville, both of Tex.

[73] Assignee: International Business Machines Corporation, Armonk, N.Y.

[21] Appl. No.: 08/839,440

[22] Filed: Apr. 14, 1997

[51] Int. Cl.[7] .............................. G06F 12/00; G06F 13/00
[52] U.S. Cl. ............................... 711/133; 711/3; 711/118; 711/146
[58] Field of Search ..................... 711/133, 135, 711/136, 118, 159, 160, 146, 3, 154

[56] References Cited

U.S. PATENT DOCUMENTS

| | | | |
|---|---|---|---|
| 4,441,155 | 4/1984 | Fletcher et al. ......................... | 711/118 |
| 4,463,420 | 7/1984 | Fletcher ................................. | 364/200 |
| 4,797,814 | 1/1989 | Brenza ................................... | 711/118 |
| 5,025,365 | 6/1991 | Mathur et al. . | |
| 5,091,846 | 2/1992 | Sachs et al. . | |
| 5,133,074 | 7/1992 | Chou . | |
| 5,319,766 | 6/1994 | Thaller et al. . | |
| 5,398,325 | 3/1995 | Chang et al. . | |
| 5,550,988 | 8/1996 | Sarangdhar et al. . | |
| 5,553,248 | 9/1996 | Melo et al. . | |
| 5,553,266 | 9/1996 | Metzger et al. . | |
| 5,553,382 | 9/1996 | Thaller et al. . | |
| 5,584,013 | 12/1996 | Cheong et al. ......................... | 395/449 |
| 5,623,627 | 4/1997 | Witt ........................................ | 395/449 |
| 5,675,765 | 10/1997 | Malamy et al. ........................ | 395/473 |
| 5,680,577 | 10/1997 | Aden ....................................... | 395/477 |
| 5,715,427 | 2/1998 | Barrera et al. .......................... | 395/463 |

*Primary Examiner*—Tuan V. Thai
*Attorney, Agent, or Firm*—Brian F. Russell; Andrew J. Dillon

[57] ABSTRACT

A method and system for managing a cache including a plurality of entries are described. According to the method, first and second cache operation requests are received. In response to receipt of the second cache operation request, an entry among the plurality of entries is identified for replacement. In response to a conflict between the first and second cache operation requests arising because the first cache operation request specifies an entry among the plurality of entries including the entry identified for replacement, an entry among the plurality of entries other than the identified entry is replaced.

21 Claims, 5 Drawing Sheets

IMPRECISE METHOD AND SYSTEM FOR SELECTING AN ALTERNATIVE CACHE ENTRY FOR REPLACEMENT IN RESPONSE TO A CONFLICT BETWEEN CACHE OPERATION REQUESTS

BACKGROUND OF THE INVENTION

1. Technical Field

The present invention relates in general to a method and system for data processing and in particular to a method and system for cache management within a data processing system. Still more particularly, the present invention relates to a method and system for cache management that select an alternative cache entry for replacement in response to a conflict between two cache operation requests.

2. Description of the Related Art

To maximize data processing system performance, the memory in a data processing system is typically arranged hierarchically, with one or more lower levels of memory, which may include nonvolatile storage and a main store, and one or more upper levels of memory, which typically include one or more levels of cache. As will be appreciated by those skilled in the art, cache memory is typically small relative to the main store and affords the processor(s) within the data processing system relatively rapid access to data and instructions.

Cache memories in conventional data processing systems are typically set associative, that is, the main store address of data is utilized to map the data to a particular congruence class that contains multiple entries or members in which the data can be stored. The data (including instructions) stored within the cache are recorded in a cache directory utilizing tags derived from the main store address, typically by selecting predetermined address bits. Thus, in response to receiving a request address, logic within the cache directory compares each of the tags stored in the directory set corresponding to the congruence class to which the request address maps with the tag bits of the request address in order to determine whether or not the requested data resides in the cache. If the requested data resides in the cache, a "hit" occurs and the requested data is handled in accordance with the type of request. On the other hand, if the requested data does not reside in the cache, a "miss" occurs. If a miss occurs in response to a read request, the contents of an entry within the congruence class to which the request address maps must be replaced with the requested data (i.e., castout). Based upon the principle of locality of reference, the entry that is replaced is typically selected in accordance with a least recently used (LRU) algorithm that determines the least recently accessed entry within the congruence class.

In order to maintain data coherency and consistency, multiprocessor data processing systems typically employ either a directory-based or snoop-based communication protocol that notifies cache memories of data accesses occurring elsewhere within the data processing system. The caches utilize the data access information, which hereinafter will be referred to as snoop requests, to invalidate data, writeback data, update the coherency state stored within the directory, or take other appropriate action based upon the coherency protocol implemented within the data processing system.

The present invention includes a recognition that a problem can arise when snoop requests received by a cache collide with cache operation requests received from the cache's associated processor. For example, if a snoop request requires the cache to update a particular directory entry and a read request mapping to the same congruence class as the snoop request misses in the cache, it is possible that the congruence class entry selected for replacement by the replacement algorithm in response to the miss is the same directory entry that must be updated in response to the snoop request. In response to this scenario, conventional caches delay servicing the read request until the update required by the snoop request is performed, thereby creating data latency and decreasing processor performance.

As should thus be apparent, it would be desirable to provide an improved method and system for cache management within a data processing system. In particular, it would be desirable to provide an improved method and system for selecting a cache entry for replacement in response to a collision between cache operation requests.

SUMMARY OF THE INVENTION

It is therefore one object of the present invention to provide a method and system for data processing.

It is another object of the present invention to provide a method and system for cache management within a data processing system.

It is yet another object of the present invention to provide a method and system for cache management that select an alternative cache entry for replacement in response to a conflict between two cache operation requests.

The foregoing objects are achieved as is now described. According to the present invention, first and second cache operation requests are received. In response to receipt of the second cache operation request, an entry among the plurality of entries is identified for replacement. In response to a conflict between the first and second cache operation requests arising because the first cache operation request specifies an entry among the plurality of entries including the entry identified for replacement, an entry among the plurality of entries other than the identified entry is replaced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
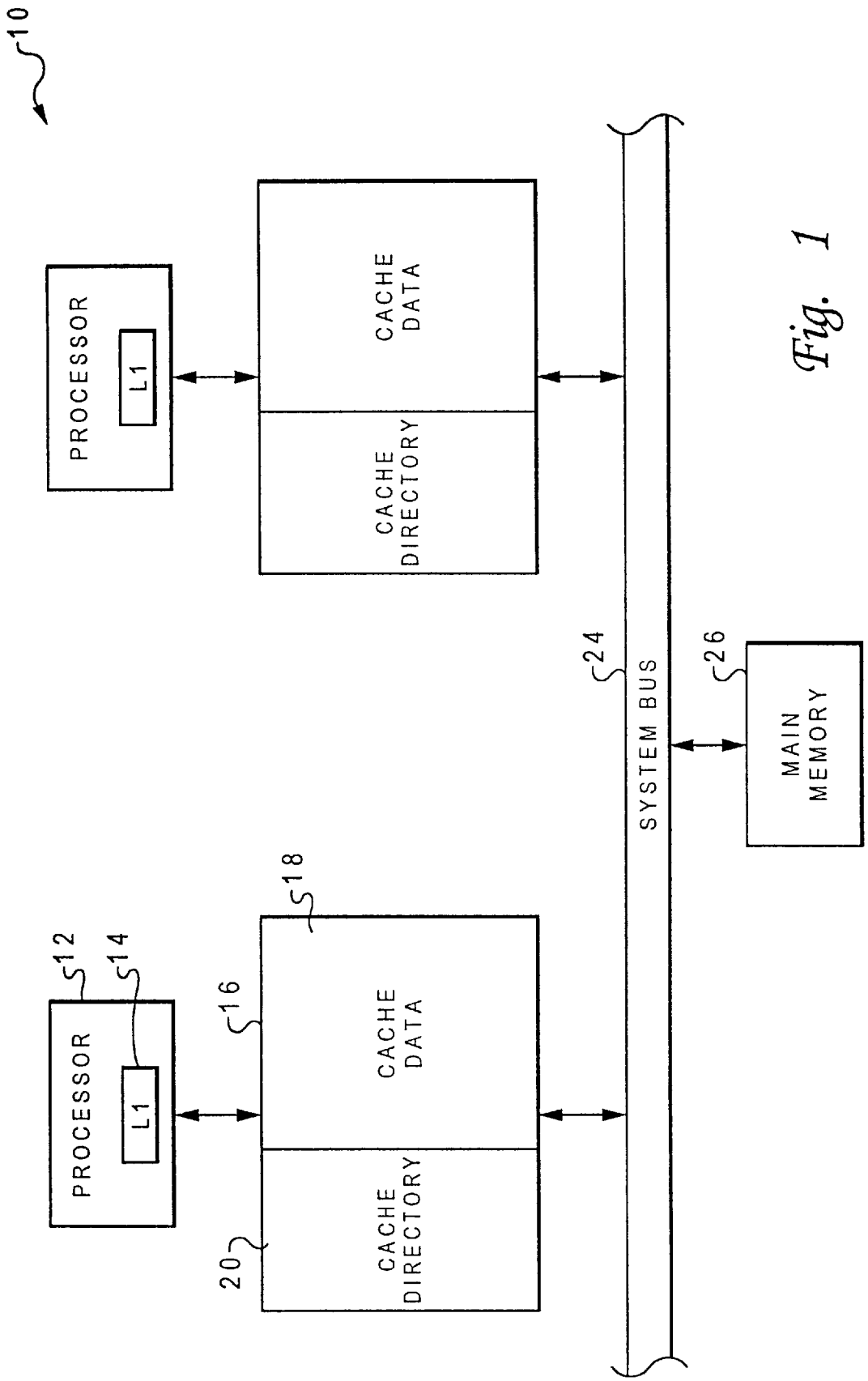
FIG. 1 depicts an illustrative embodiment of a data processing system in accordance with the method and system of the present invention.

With reference now to the figures and in particular with reference to FIG. 1, there is depicted an illustrative embodiment of a data processing system with which the present invention may advantageously be utilized. As illustrated, data processing system 10 is a multiprocessor data processing system comprising two or more processors 12. Each of processors 12 includes an on-board level one (L1) cache 14 that provides local storage for instructions and data. Each of processors 12 is coupled to its own respective level two (L2) cache 16, which includes cache data 18 and cache directory 20. L2 caches 16 are in turn coupled to shared system bus 24, which is utilized by L2 caches 16 to retrieve data and instructions requested by the associated one of processors 12 from main memory 26. Communication transactions on system bus 24 are monitored (i.e., snooped) by each of L2 caches 16 in order to determine if an update of cache directory 20 or a writeback of some of the contents of cache data 18 is required in response to a data access occurring elsewhere in data processing system 10.

Figure 2:
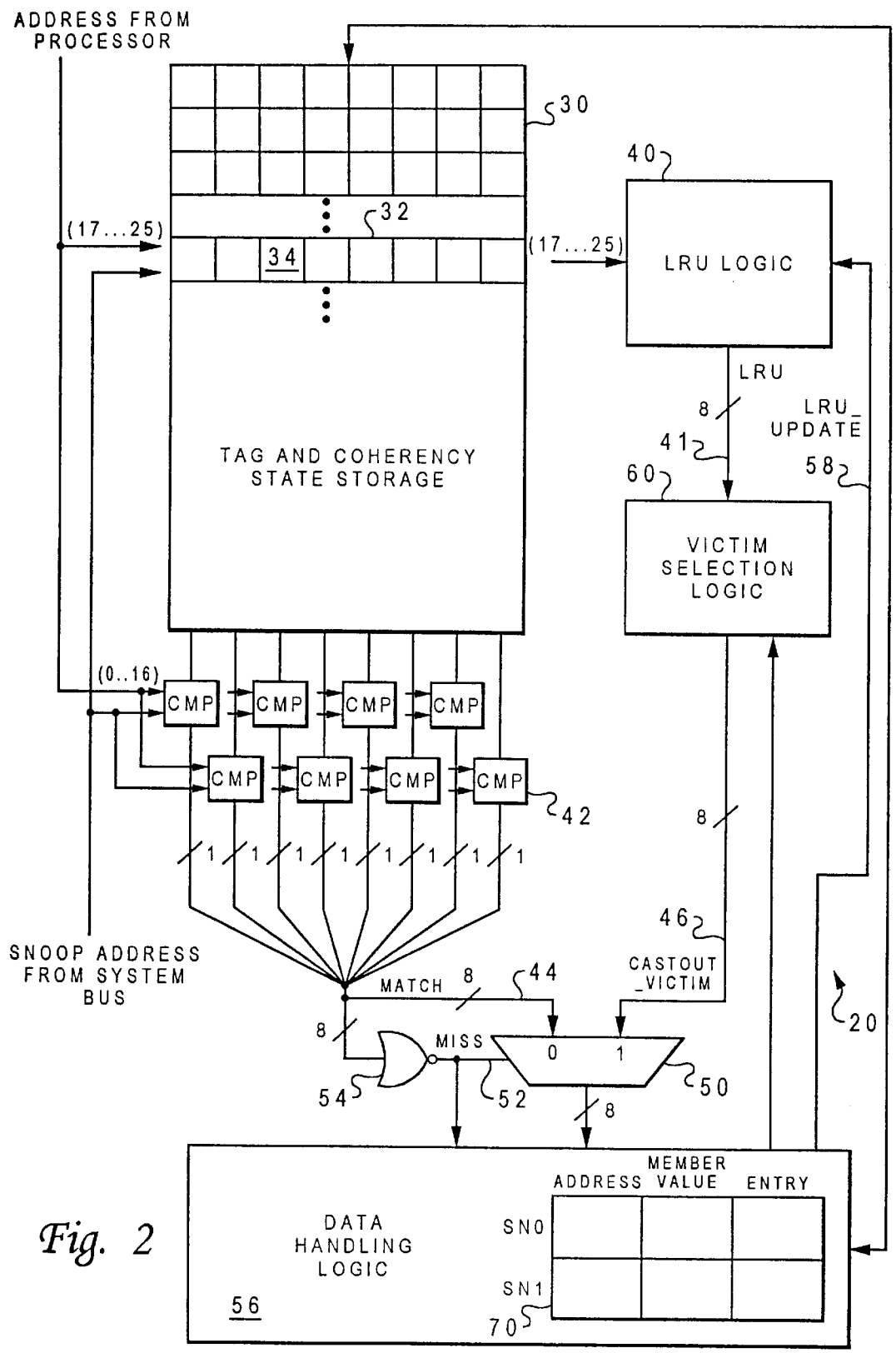
FIG. 2 illustrates a more detailed block diagram representation of a cache directory within the data processing system illustrated in FIG. 1.

Referring now to FIG. 2, there is illustrated a more detailed block diagram representation of cache directory 20 in an embodiment of data processing system 10 in which each L2 cache 16 comprises an 8-way set associative cache having 64-byte cache lines and in which 32-bit addresses are utilized. In this embodiment, bits 17–25 of a request address form an index that maps a request address to a particular congruence class of L2 cache 16, bits 0–16 of a request address form a tag that uniquely identifies a cache line stored in a congruence class entry (i.e., way), and bits 26–31 of a request address specify an offset between the data specified by the request address and the beginning of the cache line to which the data belongs.

As illustrated in FIG. 2, cache directory 20 includes tag and coherency state storage 30, which includes a number of sets 32 that each correspond to a congruence class within cache data 18. A set 32 contains 8 members 34 that each store the tag and coherency state of a corresponding entry within the congruence class with which the set 32 is associated. Cache directory 20 also includes LRU logic 40, which stores an indication of how recently each entry within each congruence class of cache data 18 has been accessed. Thus, the indication within LRU logic 40 associated with each congruence class indicates the least recently accessed entry, the second least recently accessed entry, the third least recently accessed entry, and so on. In response to receipt of index bits that specify a congruence class, LRU logic 40 generates an 8-bit decoded LRU signal 41 that indicates, by the position of a single bit set to 1, the LRU entry of the specified congruence class.

During operation of data processing system 10, cache directory 20 can receive request addresses associated with cache operation requests from either its associated processor 12 or from system bus 24. As illustrated in FIG. 2, index bits 17–25 of each request address received by cache directory 20 are input into both tag and coherency state storage 30 and LRU logic 40. Tag and coherency state storage 30 utilizes the index bits to select a set 32. The tag stored within each member 34 of the selected set 32 is then individually compared with the tag bits of the request address utilizing comparators 42, which each produce a 1-bit match indication. The 8 bits output by comparators 42 together form a decoded MATCH signal 44, which is connected to a first input of multiplexer 50.

The second 8-bit input of multiplexer 50 is connected to CASTOUT_VICTIM signal 46, which indicates a congruence class entry that will possibly be replaced in response to the cache operation request. As described in greater detail below with respect to FIGS. 3–5, victim selection logic 60 outputs the value of LRU signal 41 as CASTOUT_VICTIM signal 46 if the cache operation request associated with the request address does not conflict with another cache operation request received by cache directory 20. However, in cases in which two cache operation requests conflict (or potentially conflict), CASTOUT_VICTIM signal 46 indicates an entry within the selected congruence class other than the LRU entry. Multiplexer 50 selects one of its 8-bit inputs as an output in response to MISS signal 52 generated by NOR gate 54. Thus, in response to a hit, multiplexer 50 outputs an 8-bit decoded indication of which cache line entry stores data corresponding to the request address. Alternatively, in response to a miss, multiplexer 50 outputs a 8-bit decoded indication of a congruence class entry that may be replaced.

Still referring to FIG. 2, cache directory 20 further includes data handling logic 56, which performs data handling and cache update operations in response to MISS signal 52 and the 8-bit output of multiplexer 50. For example, in response to a read miss, data handling logic 56 requests the cache line containing the request address from main memory 26, supplies the requested data to the associated processor 12, and stores the requested cache line in the congruence class entry specified by the 8-bit output of multiplexer 50. Alternatively, in response to a read hit, data handling logic 56 supplies the data corresponding to the request address to the associated processor 12. In response to access to or replacement of a congruence class entry, data handling logic 56 generates an LRU_UPDATE signal 58 that is utilized by LRU logic 42 to update the LRU indication associated with the accessed congruence class.

In response to a snoop miss, no action is taken by data handling logic 56. Snoop hits, on the other hand, are handled by data handling logic 56 utilizing snoop queue 70. In the embodiment illustrated in FIG. 2, snoop queue 70 comprises two instances of snoop handling logic, SN0 and SN1, which each have an address field for storing a snoop request address, an entry field for storing an 8-bit decoded indication of the congruence class entry specified by the snoop request address, and a member value field for storing the coherency state of the specified entry. Snoop queue 70 permits two snoop requests to be serviced concurrently by data handling logic 56 in accordance with a selected coherency protocol. As will be appreciated by those skilled in the art, additional concurrent snoop requests can be supported by increasing the queue depth of snoop queue 70.

Figure 3:
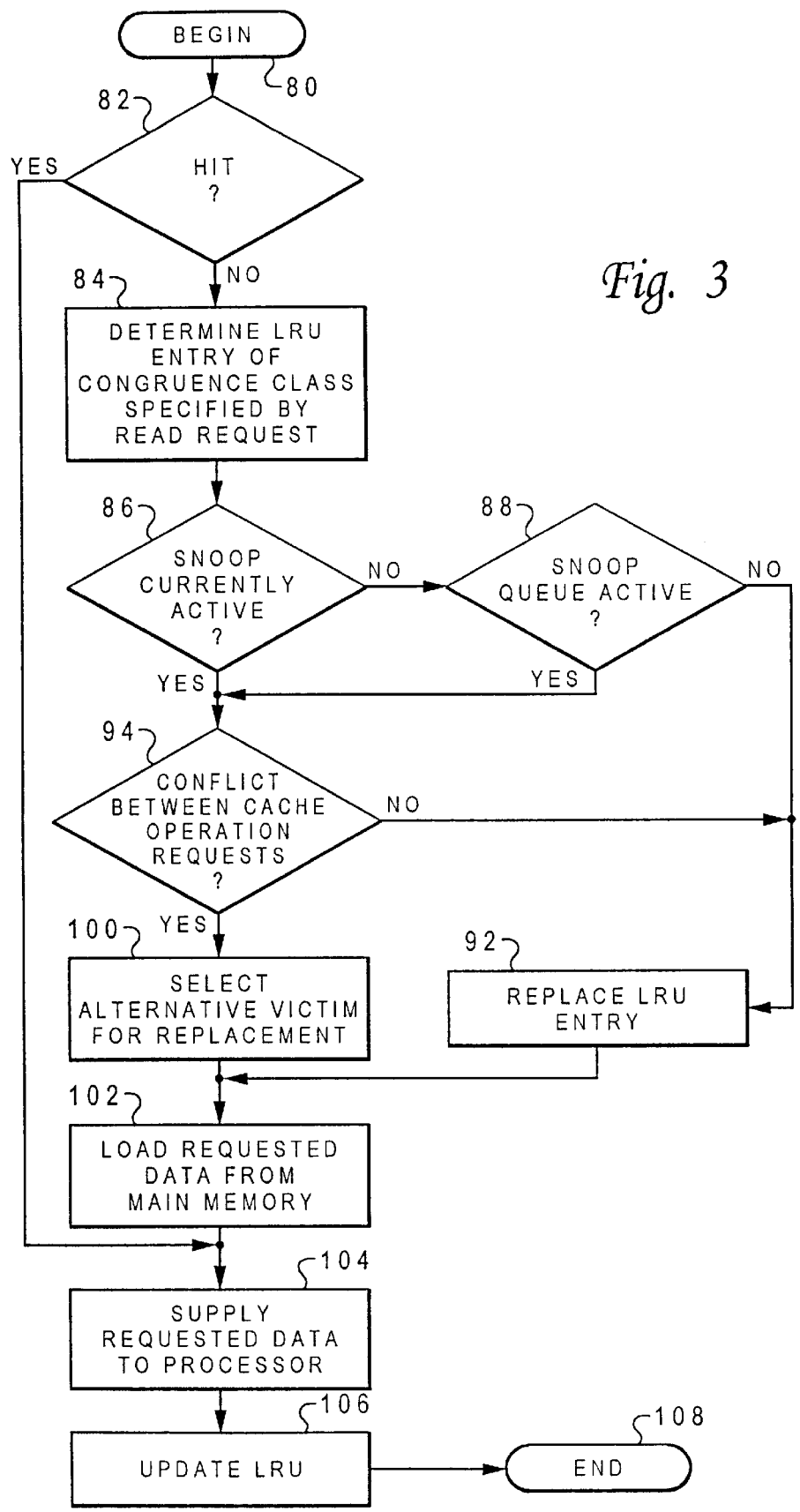
FIG. 3 is a logical flowchart depicting an illustrative embodiment of a method by which an alternative cache entry can be selected for replacement in response to a conflict between cache operation requests.

With reference now to FIG. 3, there is depicted a logical flowchart of an illustrative embodiment of a method by which an alternative cache entry can be selected for replacement in response to a conflict between cache operation requests. As illustrated, the process begins at block 80 in response to receipt of a read request including a request address. The process then proceeds from block 80 to block 82, which depicts a determination by cache directory 20 whether or not the read request results in a hit. If so, the process proceeds from block 82 to block 104, which illustrates data handling logic 56 supplying the requested data to processor 12. LRU logic 40 then updates the LRU indication associated with the congruence class to which the request address maps, as illustrated at block 106. Thereafter, the process terminates at block 108.

Referring again to block 82, in response to a determination that the request address did not hit in cache directory 20, the process proceeds to block 84. Block 84 depicts a determination by LRU logic 40 of the LRU entry of the congruence class to which the request address maps. Next, the process proceeds from block 84 to block 86, which illustrates a determination of whether or not a snoop request is currently active, that is, whether or not a snoop request was received substantially simultaneously with the read request. If not, the process passes to block 88, which depicts a determination of whether or not snoop queue 70 is active, that is, whether or not a previously received snoop request is being serviced by either of entries SN0 or SN1 of snoop queue 70. In response to a determination at block 88 that snoop queue 70 is not active, the process proceeds to block 92, which illustrates victim selection logic 60 selecting the LRU entry of the congruence class as the "victim" to be replaced. As discussed above with respect to FIG. 2, the congruence class entry to be replaced is specified in decoded format by CASTOUT_VICTIM signal 46. The process then passes to block 102, which is described below.

In response to either a determination at block 86 that a snoop is currently active or a determination at block 88 that snoop queue 70 is active, the process proceeds to block 94. Block 94 depicts a determination of whether or not a conflict exists between cache operation requests. An actual conflict between cache operation requests arises when the congruence class entry specified by a snoop request is the LRU entry identified for replacement in response to a read miss. This represents a conflict because the coherency state of the LRU entry must be updated to reflect the effect of the snoop request before the data is castout (i.e., flushed) to main memory 26.

A determination of whether or not a conflict exists between cache operation requests can be made precisely or imprecisely depending upon the desired implementation of victim selection logic 60. A first illustrative embodiment of victim selection logic 60, which is described in detail below with respect to FIG. 4, makes an imprecise determination of whether or not a conflict exists between read and snoop requests by checking if the cache operation requests both specify the same congruence class. This conflict determination mechanism is said to be imprecise because the snoop request may or may not specify the congruence class entry selected for replacement in response to the read miss. If greater precision is desired, victim selection logic 60 can be implemented utilizing the second illustrative embodiment illustrated in FIG. 5. The precise conflict determination logic depicted in FIG. 5 indicates the existence of a conflict between cache operation requests only if the snoop request specifies the congruence class entry selected for replacement in response to a read miss.

Referring to block 94, in response to a determination that there is no conflict between the read request and a snoop request, the process passes to block 92, which has been described. However, in response to a determination at block 94 that a conflict exists between the read request and a snoop request, the process proceeds to block 100, which depicts victim selection logic 60 selecting a congruence class entry other than the LRU entry as a "victim" for replacement in response to the read miss. Following block 100, the process passes to block 102, which illustrates data handling logic 56 of cache directory 20 loading the requested data from main memory 26. Importantly, in cases in which an alternative victim was selected for replacement, the loading step shown at block 102 can be performed concurrently with the handling of the snoop request in order to minimize latency.

Next, the process proceeds from block 102 to block 104, which illustrates data handling logic 56 supplying the requested data retrieved from main memory 26 to processor 12. The process then passes to block 106, which illustrates LRU logic 40 updating the LRU indication of the congruence class specified by the read request address. Thereafter, the process terminates at block 108.

Figure 4:
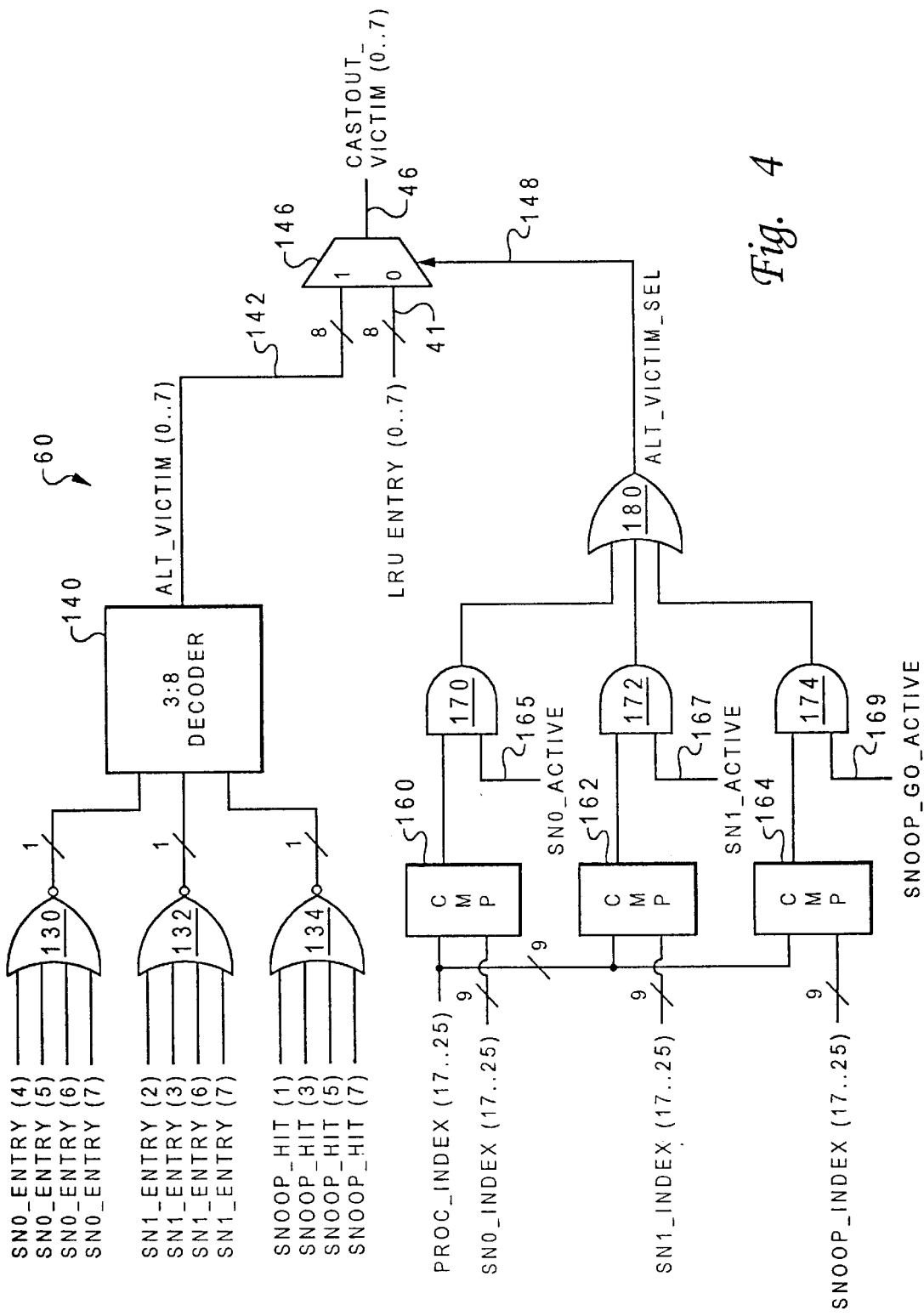
FIG. 4 shows a more detailed block diagram representation of a first illustrative embodiment of the victim selection logic illustrated in FIG. 2.

Referring now to FIG. 4, there is illustrated a detailed view of the first illustrative embodiment of victim selection logic 60. As depicted, the first illustrative embodiment of victim selection logic 60 includes alternative victim selection logic comprising NOR gates 130–134 and decoder 140. NOR gate 130 receives bits 4–7 of the 8-bit decoded entry indication stored within entry SN0 of snoop queue 70 as inputs and produces a 1-bit output. Similarly, NOR gate 132 receives bits 2, 3, 6, and 7 of the 8-bit decoded entry indication stored within entry SN1 of snoop queue 70 as inputs and produces a 1-bit output. NOR gate 134 receives bits 1, 3, 5, and 7 of an 8-bit decoded indication of the entry specified by a currently active snoop request, if any, and produces a 1-bit output. The outputs of NOR gates 130–134 are received as inputs by decoder 140, which decodes the 3-bit input into an 8-bit decoded ALT_VICTIM signal 142 that is connected to a first input of multiplexer 146. It is important to note that the congruence class entry specified by ALT_VICTIM signal 142 is always a different entry than those specified by SN0, SN1, and the currently active snoop request.

The second input of multiplexer 146 is connected to the 8-bit decoded LRU signal 41 received from LRU logic 140. Multiplexer 146 selects one of signals 142 and 41 as an output in response to ALT_VICTIM_SEL signal 148, which is asserted if a conflict between cache operation requests is detected.

ALT_VICTIM_SEL signal 148 is generated by imprecise conflict detection logic comprising comparators 160–164, AND gates 170–174, and OR gate 180. Comparators 160–164 each compare the index bits of the request address received from processor 12 with the index bits of a respective one of the addresses specified within entries SN0 and SN1 of snoop queue 70 and the address specified by a current snoop request, if any. The output of comparator 160 is qualified by SN0_ACTIVE signal 165, which indicates if entry SN0 of snoop queue 70 is active. Similarly, the output of comparator 162 is qualified by SN1_ACTIVE signal 167, which indicates if entry SN1 of snoop queue 70 is active. The output of comparator 164 is qualified by SNOOP_GO_ACTIVE signal 169, which goes high in response to receipt of a current snoop request by cache directory 20. Qualifying signals 165, 167, and 169 are each ANDed with a respective one of the outputs of comparators 160–164 utilizing AND gates 170–174. The outputs of AND gates 170–174 are input into OR gate 180, which generates ALT_VICTIM_SEL signal 148. As noted above, ALT_VICTIM_SEL signal 148 is asserted (set to 1) if a conflict is detected so that multiplexer 146 selects ALT_VICTIM signal 142 as CASTOUT_VICTIM signal 46.

Figure 5:
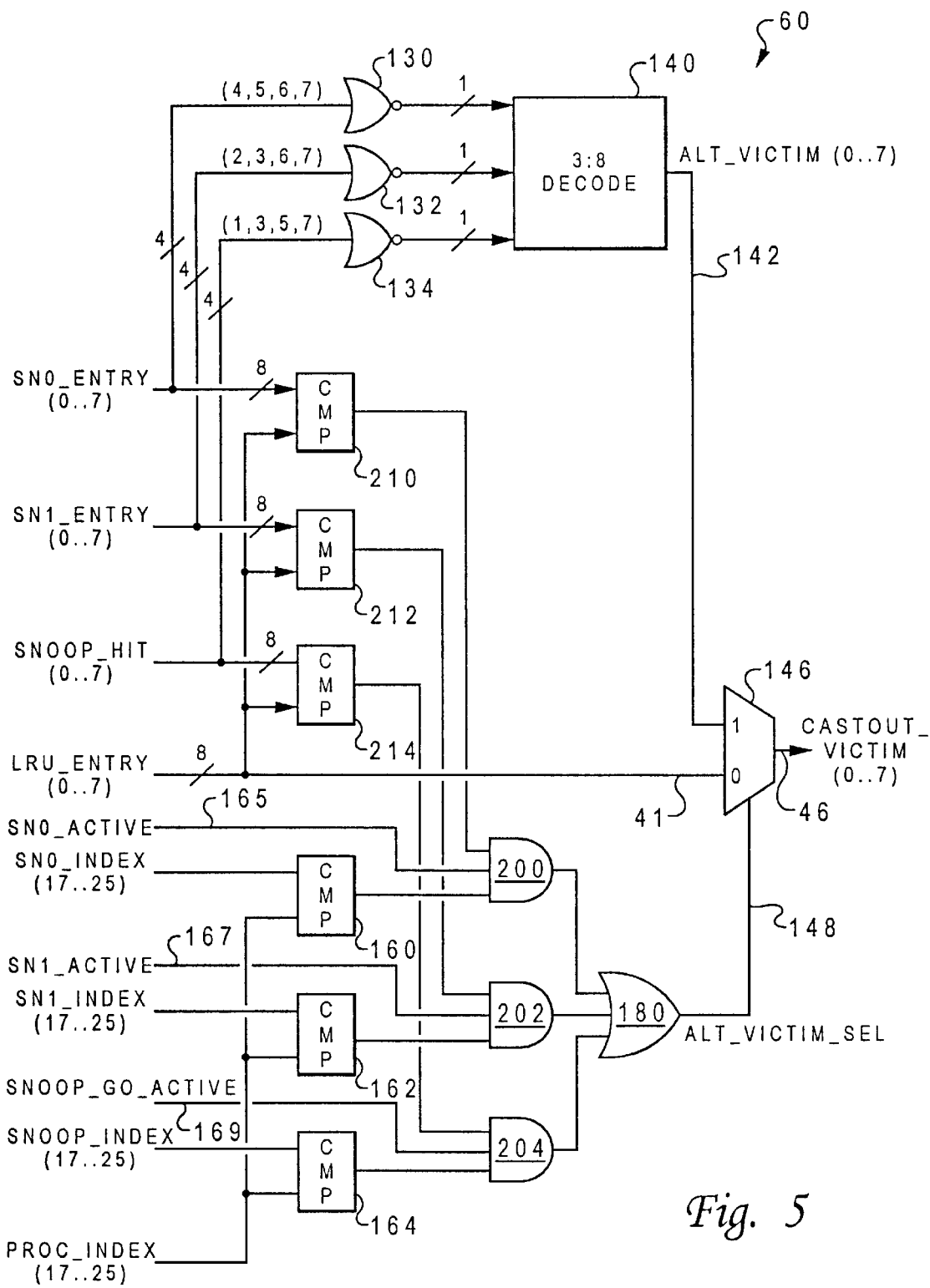
FIG. 5 shows a more detailed block diagram representation of a second illustrative embodiment of the victim selection logic illustrated in FIG. 2.

With reference now to FIG. 5, there is depicted a detailed view of the second illustrative embodiment of victim selection logic 60. As indicated by like reference numerals, the second illustrative embodiment of victim selection logic 60 is substantially similar to the first illustrative embodiment depicted in FIG. 4. However, in order to make a precise conflict determination, the conflict determination logic of the second illustrative embodiment further includes comparators 210–214, which each compare the 8-bit decoded LRU signal 41 with a respective one of the 8-bit decoded entry indications of SN0, SN1, and the current snoop request. The 1-bit outputs of comparators 210–214, which indicate whether LRU signal 41 and a snoop request both specify the same congruence class entry, are each input into one of AND gates 200–204 to further qualify the determination of whether a conflict between cache operation requests exists. Accordingly, in the second illustrative embodiment, ALT_VICTIM_SEL signal 148 is asserted only if a snoop request specifies the congruence class entry selected for replacement in response to a read miss.

As has been described, the present invention provides an improved method and system for cache management which select an alternative cache entry for replacement in response to a conflict between two cache operation requests. Conflicts between cache operation requests can be determined either precisely or imprecisely depending upon the desired implementation. By selecting an alternative cache entry for replacement, the present invention permits the cache operation requests to be serviced concurrently, thereby enhancing cache performance.

While the invention has been particularly shown and described with reference to a illustrative embodiments, it will be understood by those skilled in the art that various changes in form and detail may be made therein without departing from the spirit and scope of the invention. For example, it should be understood that the present invention is not limited to conventional set associative caches, but can also be utilized with other cache architectures.

What is claimed is:

1. A method of managing a cache including a plurality of congruence classes that each contain a plurality of entries, said method comprising:

receiving first and second cache operation requests such that said first and second cache operation requests are co-pending, wherein said first cache operation request specifies a particular congruence class among said plurality of congruence classes;

in response to receipt of said second cache operation request, selecting a congruence class and identifying an entry among said plurality of entries within the selected congruence class for replacement;

in response to said selected congruence class being said particular congruence class, replacing an entry among said plurality of entries other than said identified entry, regardless of whether said identified entry is specified by said first cache operation request.

2. The method of claim 1, and further comprising the step of receiving said second cache operation request after said first cache operation request and before completion of a first cache operation indicated by said first cache operation request.

3. The method of claim 2, said receiving step comprising the step of receiving a snoop request prior to a read request.

4. The method of claim 1, said receiving step comprising the step of receiving said first and said second cache operation requests substantially simultaneously.

5. The method of claim 1, said second cache operation request having an associated address, and said step of identifying an entry comprising the step of identifying said entry in response to said address.

6. The method of claim 1, said plurality of entries comprising a congruence class, and said step of identifying an entry comprising the step of identifying a least recently accessed entry among said plurality of entries in said congruence class.

7. The method of claim 6, said cache including an indication of a least recently accessed entry among said plurality of entries, said method further comprising the step of updating said indication.

8. The method of claim 1, wherein said first cache operation request specifies a particular entry among said plurality of entries in said particular congruence class and said replaced entry is an entry other than said particular entry.

9. The method of claim 1, wherein replacing an entry among said plurality of entries other than said identified entry comprises replacing said entry among said plurality of entries during pendency of said first cache operation request.

10. A cache, comprising:

a plurality of congruence classes that each contain a plurality of entries for storing data;

congruence class selection logic that selects a congruence class in response to a second cache operation request;

entry identification logic that identifies an entry among said plurality of entries within said selected congruence class for replacement in response to receipt of a second cache operation request; and victim selection logic that selects an entry among said plurality of entries other than said identified entry for replacement in response to a co-pending first cache operation request specifying said particular congruence class, regardless of whether said identified entry is specified by said first cache operation request.

11. The cache of claim 10, said first and second cache operation requests comprising a snoop request and a read request, respectively.

12. The cache of claim 10, said second cache operation request having an associated address that specifies said identified entry.

13. The cache of claim 10, said entry identification logic comprising least recently used (LRU) logic.

14. The cache of claim 10, wherein said first cache operation request specifies a particular entry among said plurality of entries in said particular congruence class and said replaced entry is an entry other than said particular entry.

15. The cache of claim 10, wherein said cache replaces said entry among said plurality of entries other than said identified entry during pendency of said first cache operation request.

16. A data processing system, comprising:

a processor;

a cache coupled to said processor and including:

a plurality of congruence classes that each contain a plurality of entries for storing data;

congruence class selection logic that selects a congruence class in response to a second cache operation request;

entry identification logic that identifies an entry among said plurality of entries within said selected congruence class for replacement in response to receipt of a second cache operation request; and victim selection logic that selects an entry among said plurality of entries other than said identified entry for replacement in response to a co-pending first cache operation request specifying said particular congruence class, regardless of whether said identified entry is specified by said first cache operation request.

17. The data processing system of claim 16, said first and second cache operation requests comprising a snoop request and a read request, respectively.

18. The data processing system of claim 16, said second cache operation request having an associated address that specifies said identified entry.

19. The data processing system of claim 16, said entry identification logic comprising least recently used (LRU) logic.

20. The data processing system of claim 16, wherein said first cache operation request specifies a particular entry among said plurality of entries in said particular congruence class and said replaced entry is an entry other than said particular entry.

21. The data processing system of claim 16, wherein said cache replaces said entry among said plurality of entries other than said identified entry during pendency of said first cache operation request.

* * * * *